(12) United States Patent
Malkamäki

(10) Patent No.: US 6,337,855 B1
(45) Date of Patent: Jan. 8, 2002

(54) METHOD, TRANSMITTER AND RECEIVER FOR TRANSMITTING TRAINING SIGNALS IN A TDMA TRANSMISSION SYSTEM

(75) Inventor: Esa Malkamäki, Espoo (FI)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/101,993

(22) PCT Filed: Nov. 13, 1996

(86) PCT No.: PCT/EP96/04969

§ 371 Date: Sep. 15, 1998

§ 102(e) Date: Sep. 15, 1998

(87) PCT Pub. No.: WO98/21847

PCT Pub. Date: May 22, 1998

(51) Int. Cl.[7] .............................................. H04B 7/212
(52) U.S. Cl. ...................... 370/347; 370/527; 370/529; 375/295; 375/305; 375/341
(58) Field of Search ................................ 370/319, 321, 370/336, 337, 345, 347, 349, 350, 522, 527, 528, 529; 375/231, 232, 262, 274, 295, 296, 305, 316, 340, 341, 346, 348, 350

(56) References Cited

U.S. PATENT DOCUMENTS 5,390,216 A * 2/1995 Bilitza et al. ................ 375/354
5,673,288 A * 9/1997 Okanoue ..................... 375/231
5,905,733 A * 5/1999 Solve et al. .................. 370/522

FOREIGN PATENT DOCUMENTS

| DE | 3644175 | 7/1988 |
| EP | 0 037 556 | 4/1981 |
| EP | 0 204 308 | 6/1986 |
| EP | 0 615 352 | 3/1994 |
| JP | 61063124 | 9/1984 |
| JP | 62047236 | 8/1985 |

OTHER PUBLICATIONS

*Microwave PCM Auxiliary Link Using Hybrid Modulation*, Electronic and Communications in Japan, vol. 51–B, No. 10, 1968.

* cited by examiner

*Primary Examiner*—Kwang B. Yao
(74) *Attorney, Agent, or Firm*—Heller Ehrman; White & McAuliffe

(57) ABSTRACT

The invention relates to a TDMA method, transmitter and receiver, wherein a training sequence is modulated and superposed on a data signal to thereby generate a TDMA burst. Thereby, the training sequence can be made longer and is always available during data reception, such that longer channel impulse responses can be measured. In the transmitter, the training sequence is separately modulated in a modulating means (3) before being superposed on the data signal. The receiver comprises an extracting means (11) for extracting the superposed training sequence and a cancelling means (9) for cancelling the training sequence from the data signal to be detected.

20 Claims, 2 Drawing Sheets

METHOD, TRANSMITTER AND RECEIVER FOR TRANSMITTING TRAINING SIGNALS IN A TDMA TRANSMISSION SYSTEM

FIELD OF THE INVENTION

The invention relates to a TDMA (Time Division Multiple Access) method, transmitter and receiver. In particular, the present invention relates to a digital mobile communication system, such as the GSM system (Groupe Special Mobile) or the DCS (Digital Cellular System).

BACKGROUND OF THE INVENTION

In the TDMA class of digital mobile communication systems, several users share one carrier. Each user is allocated a separate time slot on that carrier, which is used to transmit and receive short bursts of data packets separated by a guard time. The number of users on one carrier is limited to the number of slots allocated to that particular carrier.

The GSM system is described e.g. in "The GSM System for Mobile Communications", M. Moyly and M.-B. Pautet, Palaiseau, France, 1992, ISBN: 2-9507190-0-7 and is therefore not described herein in geater detail.

In current GSM systems, as for example described in document WO-A-95/28771, a predetermined bit sequence in the middle of the data in a TDMA burst is used as a training sequence required in order to calculate parameters of an impulse response of a respective channel, i.e. estimated channel impulse response taps. These parameters are used for removing interactions caused by multipath transmission.

Currently, approximately five taps of the channel impulse response can be measured by the available training sequences. If longer impulse responses should be measured, a longer training sequence would be required which would decrease the amount of data within the TDMA burst.

Regarding the problem of reduced transmission efficiency associated with the use of longer training sequences, document EP-A-0 355 587 suggests to delete training preambles within a TDMA burst and, instead, to store baseband quadrature signal components as sampled data of an entire slot in delay buffers while the clock and carrier phases are estimated. However, in this case, complex signal processing circuits are necessary for obtaining the required estimations.

SUMMARY OF THE INVENTION

It is an object of the present invention to provide an improved TDMA method, transmitter and receiver, by means of which longer impulse responses can be measured.

This object is achieved by a TDMA method, comprising the steps of modulating a training sequence and generating a TDMA burst by superposing the modulated training sequence upon a data signal.

Furthermore, this object is achieved by a transmitter for a TDMA system, comprising modulating means for modulating a training sequence, superposing means for generating a TDMA burst by superposing the modulated training sequence upon a data signal, and transmitting means for transmitting said TDMA burst.

Additionally, this object is achieved by a receiver for a TDMA system, comprising receiving means for receiving a TDMA burst, extracting means for extracting a superposed training sequence from the received TDMA burst, and cancelling means for cancelling the superposed training sequence before data detection.

Since the training sequence is superposed on the TDMA burst, a long training sequence which may be as long as the whole burst may be used. Thus, the training sequence is always available and can be used to measure longer or shorter channel impulse responses.

Another advantage is that this type of training sequence could be used for estimation of frequency error as well as any change in the channel impulse response over the burst.

A preferred embodiment of the method, transmitter and receiver of the invention is evident from the attached dependent claims.

BRIEF DESCRIPTION OF THE DRAWINGS

In the following, the invention and a preferred embodiment will be described in greater detail with reference to the accompanying drawings in which:

As shown in FIG. 1, a known TDMA burst according to the GSM specifications contains two information sections (58 bits) separated by a training sequence (26 bits) in the middle of the burst. In addition the burst contains a short (3 bits) beginning and end sequence at the ends of the burst.

FIG. 2 shows a TDMA burst according to the present invention, wherein a longer training sequence is provided, which is not in the middle of the data but on top of (or better below) the data and which has less power. This is especially suitable for systems with large bursts, because in this case the training sequence can be long enough and therefore can be transmitted with less power. The beginning and end sequence may remain in the new structure.

As training sequences, those used in the GSM system or longer CAZAC sequences, e.g. those proposed in "Almost perfect autocorrelation sequences" by Jacques Wolfmann, IEEE Transactions on Information Theory, Vol. 38, No. 4, July 1992, or M-sequences may be used. The sequence is modulated and superposed, e.g. added, upon the data signal. If the sequence is not long enough, it may be repeated periodically. In this case, good periodical autocorrelation properties are required. The period should be long enough to ensure measurement of the required amount of taps of the channel inpulse response. If the period of the training sequence is 32 bits, then up to 15 taps can be measured, which is enough for most applications.

Since the total training sequence can be longer according to the present invention, the whole sequence can be repeated many times. Thereby, the whole training sequence or only a part of it can be used for channel estimation.

On the other hand, the period should not be too long, so that the training sequence can be used for estimating frequency errors, i.e. the channel impulse response can be measured in several points along the burst in order to derive phase changes as well as other changes.

The power of the superposed training sequence has to be small enough to prevent excessive disturbance of the modulated TDMA data signal. However, the power should be high enough to obtain reliable channel estimations. The power also depends on the length of the burst. In practice, the training sequence power should be 0 to 10 dB below the signal power.

Figure 1:
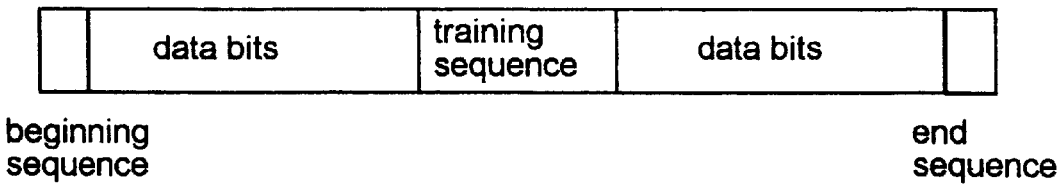
FIG. 1 shows a TDMA burst according to the prior art.
Figure 2:
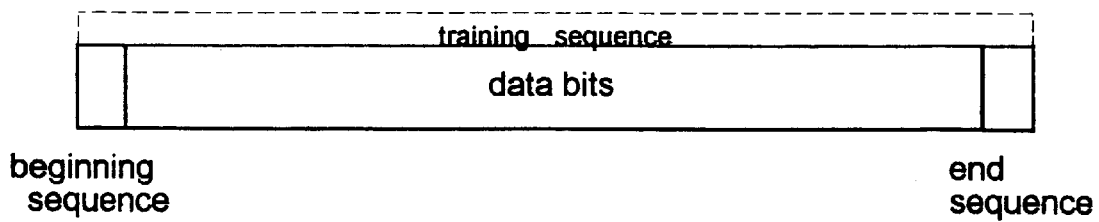
FIG. 2 shows a TDMA burst according to the present invention.
Figure 3:
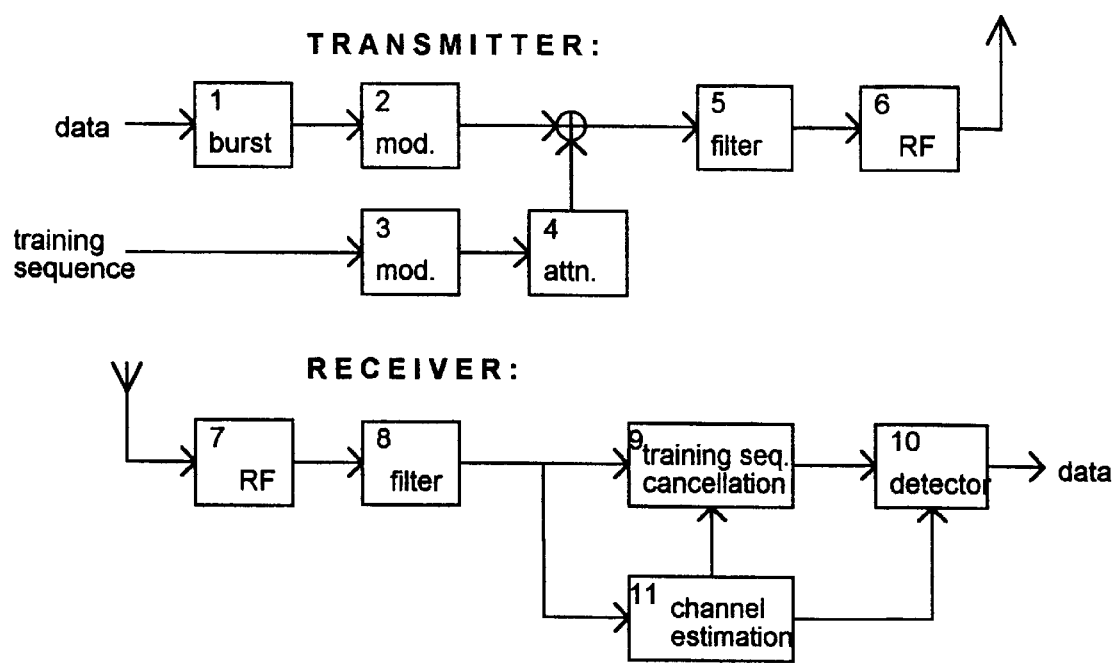
FIG. 3 is a block diagram showing a transmitter and a receiver of a TDMA system according to an embodiment of the present invention.

FIG. 3 shows a block diagram comprising those parts of a transmitter unit and a receiver unit of an embodiment of the present invention, which are essential for understanding the present invention.

According to the upper portion of FIG. 3, the transmitter unit comprises a burst generating means 1 which generates a burst on the basis of input data supplied thereto. The generated burst is modulated in a first modulating means. In addition thereto, a second modulating means 3 is provided for separately modulating a supplied training sequence. The modulated training sequence is attenuated in an attenuator 4 which, for example, may be adjustable. The attenuation factor of the attenuator 4 is selected so as to minimize disturbance of the data burst and to ensure reliable data detection. The attenuated modulated training sequence is superposed onto the modulated data burst. This can be effected by adding both modulated signals, for example.

In case Gaussian Minimum Shift Keying (GMSK) is used as a modulation method for transmission, the superposition of the data burst and the training sequence is preferably performed at intermediate frequency level.

In case a linear modulation is used in the TDMA system, the superposition of the data burst and the training sequence may also be performed at baseband level.

The modulation methods of the training sequence and the data burst may also differ from each other, as long as subsequent separation is possible without excessive deterioration. In order to be able to measure the whole channel, it is preferred to use same modulation frequencies for the above modulations of the data burst and the training sequence.

The resultant combined signal is filtered by a filtering means 5 in order to restrict the transmission bandwidth according to the corresponding system requirements. The combined and filtered TDMA signal obtained from the filtering means 5 is then supplied to a radio frequency (RF) transmitting means 6 which transmits the combined signal as an RF burst using a transmitting antenna.

The receiver unit shown in the lower part of FIG. 3 comprises an RF receiving means 7 which receives an RF burst with a receiving antenna. The RF receiving means 7 demodulates the received RF burst by using a local oscillator (not shown). The demodulated TDMA signal is filtered by a filtering means 8 in order to remove unwanted frequency components. The received combined TDMA signal is branched and the superposed training sequence is extracted and detected by a channel estimating means 11 using a filtering means (not shown) such as an adapted filter.

The kind of extraction depends on the autocorrelation properties of the training sequence. If the training sequence exhibits good autocorrelation properties, then simple matched filter/correlation methods can be employed, i.e. the signal is correlated in the receiver with the known training sequence. Due to the good autocorrelation properties, the output of this correlation is the channel estimate plus noise generated due to the random data signal, interferences from other users and Gaussian noise. The training sequence could be any random sequence, but then more complex estimation methods would be required. Therefore, good sequences are preferred.

The detected training sequence is used by said channel estimation means 11 to measure desired parameters of the channel impulse response.

In the other branch, the training sequence is cancelled from the received data burst by a training sequence cancelling means 11. The cancellation may be effected by an interference cancellation technique on the basis of the measured channel impulse response parameters which are supplied to the training sequence cancelling means 11 by the above mentioned channel estimating means 11. In the training sequence cancelling means 11, the training sequence can be regenerated and subtracted from the received signal before data detection.

Alternatively, the training sequence cancellation may be effected by simple cut-off or limiting techniques in case of constant envelope data modulation. Thereby, any disturbance of subsequent data detection can be prevented.

After the superposed training sequence has been cancelled from the received burst, data detection is performed in a detector 10 on the basis of the channel impulse response parameters which are also supplied to the detector 10 from the channel estimating means 11. Finally, the detector 10 outputs the received data. Conventional detectors such as MLSE-detectors (Viterbi), DFE-detectors, etc. may be used as the detector 10.

The present invention could be further improved by providing a receiver in which iterations are employed. Therein, the channel estimation and the data detection are initially performed, followed by an estimation of the received data, which can be used to regenerate the received data signal, i.e. the detected bits are modulated and filtered with the channel estimate. The regenerated data signal can be subtracted from the received signal and a new channel estimation can be performed. In case most of the data bits are correct, this process improves the channel estimate. This leads to an improved training sequence cancellation and data detection. The iteration process can be repeated several times until a desired improvement has been reached.

For measuring frequency errors, separate channel estimates are performed at different parts of the data burst by using only a part of the training sequence. Subsequently, the phase errors between the channel estimates are measured and used as an indicator of frequency errors.

It should be understood that the above description and accompanying figures are only intended to illustrate the present invention. Thus, the method according to the invention may also be used in systems other than the described GSM system. The preferred embodiment of the method, receiver and transmitter of the invention may thus vary within the scope of the attached claims.

What is claimed is:

1. An improved method for wireless electronic signal transmission of the TDMA type, comprising the steps of:
    a) supplying a training sequence;
    b) modulating said training sequence;
    c) supplying a data signal; and
    d) generating a TDMA burst by superposing said modulated training sequence upon said data signal.

2. An improved TDMA method according to claim 1, wherein said training sequence is used for calculating parameters of an impulse response of a transmission channel.

3. An improved TDMA method according to claim 2, wherein said TDMA transmitting method is used in a GSM or a DCS system.

4. An improved TDMA method according to claim 2, wherein said training sequence is used for at least one of estimating a change in the channel impulse response over the TDMA burst and measuring a frequency error.

5. An improved TDMA method according to claim 2, wherein said training sequence is a CAZAC sequence or an M sequence.

6. An improved TDMA method according to claim 1, wherein said modulated training sequence is added to a modulated data signal prior to generating said TDMA burst.

7. An improved TDMA method according to claim 6, wherein the power of said superposed training sequence is lower than the power of said modulated data signal.

8. An improved TDMA method according to claim 1, wherein said training sequence is repeated periodically within the length of said TDMA burst.

9. An improved TDMA method according to claim 7, wherein the power of said superposed training sequence is smaller than the power of said data signal.

10. An improved transmitter for a TDMA type wireless signal transmission system, comprising in operative combination:
   a) at least one modulator modulating a supplied training sequence and providing a modulated training sequence output to a superposer;
   b) said superposer which superposes said modulated training sequence on a data signal to generate a TDMA burst signal; and
   c) a transmitter which transmits said TDMA burst signal.

11. An improved transmitter according to claim 10, wherein said modulator modulates said training sequence separate from said data signal.

12. An improved transmitter according to claim 11, which includes a second modulator to modulate said data signal.

13. An improved transmitter according to claim 11, which includes an attenuator which receives said modulated training sequence from said modulator and attenuates it, and forwards an attenuated training sequence to said superposer to be superposed on said data signal.

14. An improved transmitter according to claim 13, wherein said attenuator is adjustable.

15. An improved receiver for a TDMA type wireless signal transmission system, comprising in operative combination:
   a) at least one receiver which receives a TDMA burst signal which includes a data signal and a superposed training sequence;
   b) an extractor which extracts a training sequence from said received TDMA burst signal; and
   c) a cancelor which cancels said superposed training sequence in said TDMA burst signal before data detection.

16. An improved receiver according to claim 15, wherein said extractor comprises a filter for extracting said training sequence.

17. An improved receiver according to claim 16, wherein said filter is an adaptive filter.

18. An improved receiver according to claim 17, wherein said extractor measures parameters of a channel impulse response based on said extracted training sequence.

19. An improved receiver according to claim 18, wherein said parameters of said channel impulse response are supplied to said cancelor which cancels said training sequence from said receiver TDMA burst by interference cancellation based on said supplied parameters.

20. An improved receiver according to claim 18, which includes a detector that detects data based on said channel response parameters supplied to it by said extractor.

* * * * *